United States Patent
Raszka et al.

(10) Patent No.: US 11,836,068 B2
(45) Date of Patent: Dec. 5, 2023

(54) SYSTEM AND METHOD FOR RECOMMENDING STATIC ANALYSIS FIXES

(71) Applicant: PARASOFT CORPORATION, Monrovia, CA (US)

(72) Inventors: Leszek Jerzy Raszka, Czechowice Dziedzice (PL); Leonid Borodaev, The Hague (NL)

(73) Assignee: PARASOFT CORPORATION, Monrovia, CA (US)

( * ) Notice: Subject to any disclaimer, the term of this patent is extended or adjusted under 35 U.S.C. 154(b) by 187 days.

(21) Appl. No.: 17/574,466

(22) Filed: Jan. 12, 2022

(65) Prior Publication Data
US 2022/0222169 A1    Jul. 14, 2022

Related U.S. Application Data

(60) Provisional application No. 63/137,583, filed on Jan. 14, 2021.

(51) Int. Cl.
*G06F 11/07* (2006.01)
*G06F 11/32* (2006.01)
(Continued)

(52) U.S. Cl.
CPC ...... *G06F 11/3616* (2013.01); *G06F 11/0772* (2013.01); *G06F 11/327* (2013.01); *G06N 20/00* (2019.01)

(58) Field of Classification Search
CPC ............. G06F 11/3616; G06F 11/0772; G06F 11/327; G06N 20/00
See application file for complete search history.

(56) References Cited

U.S. PATENT DOCUMENTS 10,395,041 B1 *  8/2019  Youngberg ......... G06F 11/3608
10,649,882 B2 *  5/2020  Li ......................... G06F 11/008
(Continued)

FOREIGN PATENT DOCUMENTS

EP      3496329 A1 *  6/2019  ............. G06F 21/31
WO  WO-2009089294 A2 *  7/2009  ........... G06F 11/3616

OTHER PUBLICATIONS

D. Kim, Y. Tao, S. Kim and A. Zeller, "Where Should We Fix This Bug? A Two-Phase Recommendation Model," in IEEE Transactions on Software Engineering, vol. 39, No. 11, pp. 1597-1610, Nov. 2013 (Year: 2013).*

(Continued)

*Primary Examiner* — Matthew M Kim
*Assistant Examiner* — Indranil Chowdhury
(74) *Attorney, Agent, or Firm* — LEWIS ROCA ROTHGERBER CHRISTIE LLP

(57) ABSTRACT

System and method for recommending static analysis fixes in a computer program include: receiving violations from a static analysis tool and the meta data related to the violations; for each violation, encoding a code snippet in which said each violation is located into a first vector and encoding meta-data associated with each violation into a second vector; for each violation, concatenating the first vector and the second vector into a single vector; generating a utility matrix from the single vectors, where values in each cell correspond to a certain user's action on one of the violations; revising the utility matrix, based on user selection of selected violations of the plurality of violations; and executing a matrix factorization process to build intermediate representations of users and sets of violations to update the utility matrix as an updated utility matrix to obtain predictions for missing values, as recommendation to the user.

19 Claims, 6 Drawing Sheets

(51) Int. Cl.
  *G06F 11/36* (2006.01)
  *G06N 20/00* (2019.01)

(56) References Cited

U.S. PATENT DOCUMENTS

| | | | | |
|---|---|---|---|---|
| 11,200,144 | B1* | 12/2021 | Cook | G06F 11/3608 |
| 11,429,360 | B1* | 8/2022 | Agarwal | G06F 8/51 |
| 11,537,506 | B1* | 12/2022 | Dasgupta | G06F 11/1476 |
| 11,748,667 | B2* | 9/2023 | Bhargava | G06F 17/18 |
| | | | | 706/45 |
| 2009/0299996 | A1* | 12/2009 | Yu | G06F 17/16 |
| | | | | 707/999.005 |
| 2012/0030159 | A1* | 2/2012 | Pilaszy | G06Q 30/00 |
| | | | | 706/46 |
| 2015/0089297 | A1* | 3/2015 | Johnson | G06F 8/00 |
| | | | | 714/38.1 |
| 2015/0317234 | A1* | 11/2015 | Ligman | G06F 11/3612 |
| | | | | 714/38.1 |
| 2016/0182558 | A1* | 6/2016 | Tripp | G06F 21/562 |
| | | | | 726/25 |
| 2017/0068612 | A1* | 3/2017 | Herzig | G06F 11/3692 |
| 2017/0116519 | A1* | 4/2017 | Johnson | G06N 3/08 |
| 2017/0169354 | A1* | 6/2017 | Diamanti | G06F 11/3688 |
| 2018/0219561 | A1* | 8/2018 | Litsyn | H03M 13/2915 |
| 2019/0215551 | A1* | 7/2019 | Modarresi | H04N 21/251 |
| 2019/0347209 | A1* | 11/2019 | Seifert | G06F 12/0646 |
| 2020/0301672 | A1* | 9/2020 | Li | G06F 11/3608 |
| 2020/0349052 | A1* | 11/2020 | Wehr | G06F 8/427 |
| 2020/0401702 | A1* | 12/2020 | Karabatis | G06F 8/75 |
| 2021/0117305 | A1* | 4/2021 | Raszka | G06N 3/08 |
| 2021/0168165 | A1* | 6/2021 | Alsaeed | G06N 5/04 |
| 2022/0171697 | A1* | 6/2022 | Moukahal | G06N 5/048 |
| 2022/0269583 | A1* | 8/2022 | Plawecki | G06F 11/3457 |
| 2023/0195845 | A1* | 6/2023 | Dasgupta | G06N 5/04 |
| | | | | 706/12 |
| 2023/0236950 | A1* | 7/2023 | Cope | G06F 11/3604 |
| | | | | 717/126 |

OTHER PUBLICATIONS

Chen WH, Hsu CC, Lai YA, Liu V, Yeh MY, Lin SD. Attribute-Aware Recommender System Based on Collaborative Filtering: Survey and Classification. Front Big Data. Jan. 15, 2020;2:49. (Year: 2020).*

K. Liu, D. Kim, T. F. Bissyande, S. Yoo and Y. Le Traon, "Mining Fix Patterns for FindBugs Violations," in IEEE Transactions on Software Engineering, vol. 47, No. 1, pp. 165-188, Jan. 1, 2021 (Year: 2021).*

* cited by examiner

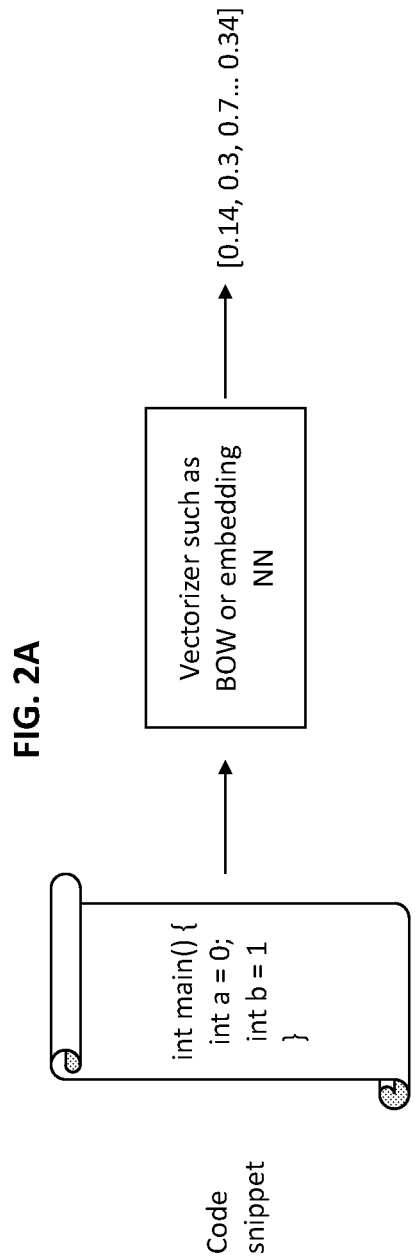

FIG. 3A

| | Violation 1 | Violation 2 | Violation 3 | Violation 4 | ... | Violation K |
|---|---|---|---|---|---|---|
| User 1 | 1 | | 0 | 0 | ... | 1 |
| User 2 | | | | | ... | |
| User 3 | | | 1 | | ... | |
| ... | | | | | ... | |
| User N | | 0 | | | ... | |

FIG. 3B

| | Violation 1 | Violation 2 | Violation 3 | Violation 4 | ... | Violation K |
|---|---|---|---|---|---|---|
| User 1 | 1 | 1 | 0 | 0 | ... | 1 |
| User 2 | 1 | 1 | 1 | 0 | ... | 0 |
| User 3 | 0 | 0 | 1 | 0 | ... | 1 |
| ... | | | | | ... | |
| User N | 0 | 1 | 1 | 0 | ... | 1 |

SYSTEM AND METHOD FOR RECOMMENDING STATIC ANALYSIS FIXES

CROSS-REFERENCE TO RELATED APPLICATIONS

This Patent Application claims the benefits of U.S. Provisional Patent Application Ser. No. 63/137,583, filed on Jan. 14, 2021, and entitled "System and Method for Recommending Static Analysis Fixes," the entire content of which is hereby expressly incorporated by reference.

FIELD

The present disclosure relates generally to software static analysis testing and more particularly to a system and method for recommending static analysis fixes.

BACKGROUND

Static code analysis is computerized analysis of a computer program that is performed without executing the program under test. A static code analysis tool (software) attempts to find errors of a certain type in the program, or prove the absence thereof, by studying the source code of the program. The information obtained from static analysis include highlighting possible coding errors to formal methods that mathematically prove properties about a given program, for example, whether the behavior of the program matches that of its specification.

However, by its nature, static code analysis is bound to produce a number of findings that actually don't designate any true errors in the program under test. The proportion of false alarms depends vastly on the soundness of the static analyzer. Sound static analyzers report all lines of code for which the correctness can't be proven. Unsound static analyzers only report lines of code for which a presence of violation of the rule for which the program is analyzed can be proven. Most tools, however, fall somewhere in between those two extremes, and their soundness level can sometimes be configured and is usually different for every rule for which the program is scanned. These findings, which are traditionally referred to as false positives violations, hinder the progress of the development or testing team and become a major obstacle in the adoption of the static code analysis into the software development practice.

Everyone in a software development organization has his/own perspective on what aspects of quality are really important. For example, a security engineer, a data protection officer and a performance and reliability engineer don't share the same view on which deficiencies of the code base need to be remedied first. It is no surprise, therefore, that once the organization matures to the level where the developers are ready to introduce static code analysis into their development process flow, the findings that are of the most importance to some are considered noise or even false positives to other. Furthermore, even a well-configured static code analyzer can produce tens of thousands of reports on its first execution on a sufficiently large codebase.

The frustration caused by having to deal with irrelevant or too many results to review, analyze and fix the errors can reduce the productivity of the development team.

A recommender system, or a recommendation system is a subclass of information filtering system that seeks to predict the "rating" or "preference" a user would give to an item. Recommender systems are utilized in a variety of areas and are most commonly recognized as playlist generators for video and music services like Netflix™, YouTube™ and Spotify™, product recommenders for services such as Amazon™, or content recommenders for social media platforms such as Facebook™ and Twitter™. These systems can operate using a single input, like music, or multiple inputs within and across platforms like news, books, and search queries.

Some previous attempts to use Machine Learning (ML) for improving the user experience when working with static code analysis have been mostly limited to predicting the probability of a certain finding being a true error or a false alarm. In contrast, the disclosed approach is based on combination of a user model and a violation model.

SUMMARY

Present disclosure is directed to a method and a system for recommending fixes for a static analysis software test. The method is executed by one or more processors, such as servers, desktop computers, laptop, and the like.

In some embodiments, the disclosure is directed to a method for recommending static analysis fixes in a computer program. The method includes: receiving, over a computer network, a plurality of violations from a static analysis tool and the meta data related to the plurality of violations; for each of the plurality of violations, encoding a code snippet in which said each violation is located into a first vector and encoding meta-data associated with said each violation into a second vector; for each of the plurality of violations, concatenating the first vector and the second vector into a single vector for said each violation; generating a utility matrix from the single vectors of each violation, wherein every row of the utility matrix corresponds to a user and every column corresponds to a violation, and wherein values in each cell of the utility matrix correspond to a certain user's action on one of the violations; revising the utility matrix, based on user selection of selected violations of the plurality of violations; and executing a matrix factorization process to build intermediate representations of users and violations to update the utility matrix as an updated utility matrix to obtain predictions for missing values, as recommendation to the user.

In some embodiments, the disclosure is directed to a system for recommending static analysis fixes in a computer program. The system includes: a recommender system for receiving, over a computer network, a plurality of violations from a static analysis tool and the meta data related to the plurality of violations; for each of the plurality of violations, encoding a code snippet in which said each violation is located into a first vector and encoding meta-data associated with said each violation into a second vector; for each of the plurality of violations, concatenating the first vector and the second vector into a single vector for said each violation; generating a utility matrix from the single vectors of each violation, wherein every row of the utility matrix corresponds to a user and every column corresponds to a violation, and wherein values in each cell of the utility matrix correspond to a certain user's action on one of the violations; revising the utility matrix, based on user selection of selected violations of the plurality of violations; and executing a matrix factorization process to build intermediate representations of users and sets of violations to update the utility matrix as an updated utility matrix to obtain predictions for missing values, as recommendation to the user; and a display for displaying the recommendation to the user.

In some embodiments, the concatenated vector may be generated by a bag of words (BOW) counting the number of occurrences of every word and token in a source code of the computer program; and representing the vectors as a fixed length with counts of a certain token or word in a specific position in the vectors. In some embodiments, the concatenated vector may be generated by embeddings obtained from training a neural network model on examples of a source code of the computer program and the plurality of violations. In some embodiments, the concatenated vector may be generated by known source code embedding techniques created from snippet of source code of the computer program surrounding each of the plurality of violation.

In some embodiments, the metadata is factorized by transforming every value in every column into a category and assigning to every category an integer number.

BRIEF DESCRIPTION OF THE DRAWINGS

A more complete appreciation of the disclosure, and many of the attendant features and aspects thereof, will become more readily apparent as the disclosure becomes better understood by reference to the following detailed description when considered in conjunction with the accompanying drawings in which like reference symbols indicate like components.

FIG. 2A depicts an exemplary process for code snippet vectorization, according to some embodiments of the disclosure.

FIG. 3A shows an exemplary utility matrix for test violations, according to some embodiments of the disclosure.

FIG. 3B shows an exemplary matrix (table) with recommended values, according to some embodiments of the disclosure.

DETAILED DESCRIPTION

In some embodiments, the disclosure is directed to a Machine Learning-based recommender system that observes the actions of different team members, builds their profiles and suggests to every user the violations that they would most likely need to fix. This significantly improves the performance of the team and cuts the time required to perform the review of static code analysis findings, since every user is first shown only the violations that they specifically are interested in. The system and method of the disclosed invention provides significant improvements over the previous systems and helps reduce the time and effort needed to review the results of static code analysis. Moreover, solution is transferable across teams and organizations.

In some embodiments, the disclosure is a system and method for determining a set of static code analysis violations that the current user is most likely need to fix immediately, based on the similarity in the current user's interests to some other user's interests. In some embodiments, the disclosed invention constructs vectors for code snippets containing error candidates, merges the vectors with other vectors constructed from the meta-data associated with the violations, and applies matrix factorization algorithms to determine the values in the empty cells of the utility matrix where rows represent users and columns represent violations, and the values in the cell represent whether of violations was fixed by a user or not.

As known in the art, matrix factorization is a factorization of a matrix into a product of matrices. There are many different matrix decompositions, including LU decomposition that factorizes a matrix into a lower triangular matrix L and an upper triangular matrix U, QR decomposition, Schur decomposition, Jordon decomposition and other know methods.

In some embodiments, the disclosed invention improves the test results of a static code analyzer, by receiving a plurality of test violations from the static code analyzer and constructing a first vector for each code snippet containing error candidates; and a second vector for each test violation from meta-data associated with said each test violation. The disclosed invention then merges the first vector with the second vector to produce a feature vector for each test violation and applies techniques from the field of recommender systems to feature vectors of every violation to estimate whether this violation is interesting for a certain user or not.

In some embodiments, the disclosed invention observes for each user which of the reported violations from the entire list of findings. After this information from the user is collected, the system performs matrix factorization and fills in the predictions for the remaining un-reviewed violations for the remaining users, based on similarity in the users' interests.

Figure 1A:
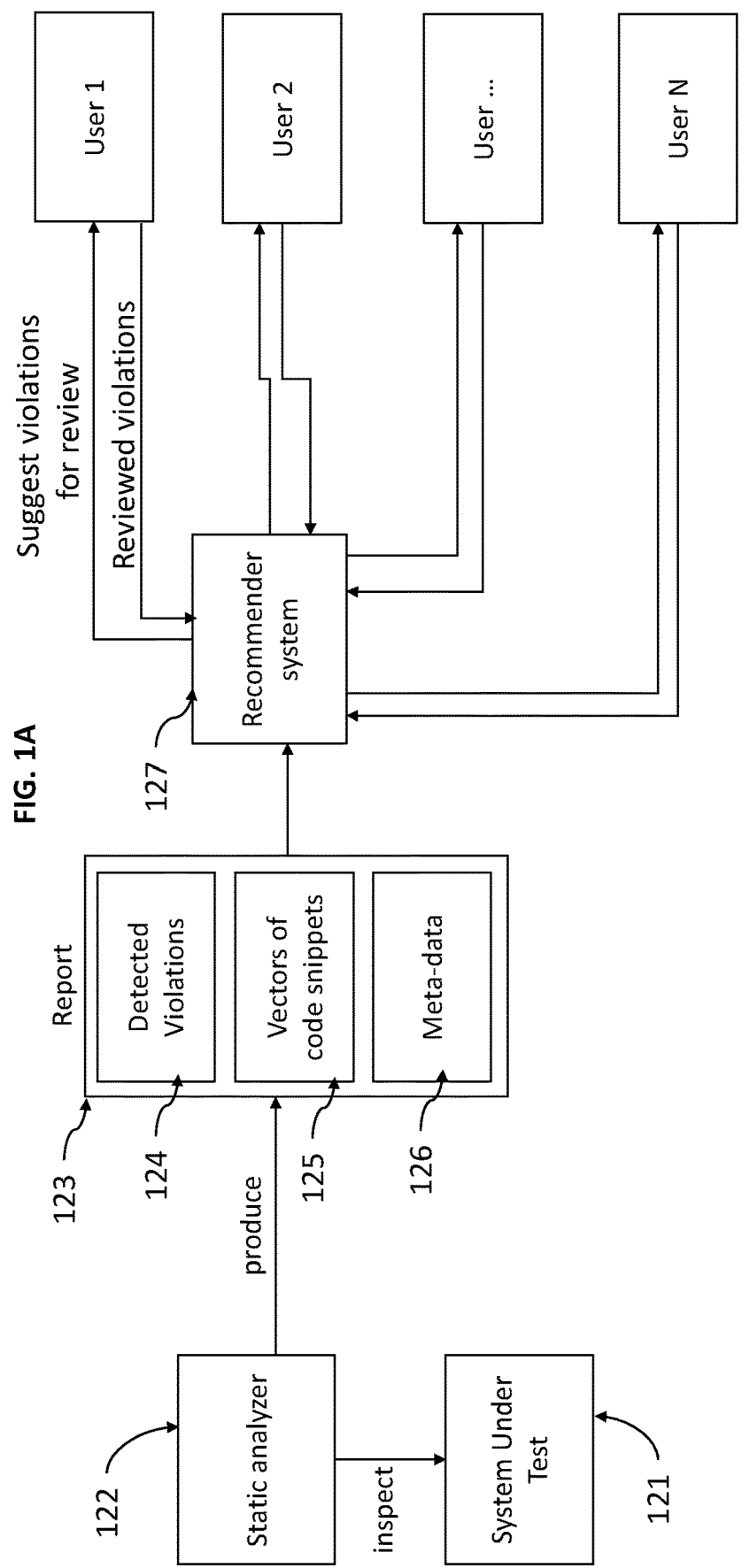
FIG. 1A illustrates an exemplary architecture of a system for using static analysis features combined with code representation features, according to some embodiments of the disclosure.

FIG. 1A illustrates an exemplary architecture of a system for using static analysis features combined with code representation features related to test violations from across a number of projects to improve the experience of the user working with static code analysis, according to some embodiments of disclosed invention. As depicted, a static analyzer 122 performs the analysis of the source code of a system under test 121, usually as a separate activity initiated by the developer, or as part of the process of building the executable code. The static analyzer 122 takes the source code of the program and checks it for conformance to the set of rules for which it has been configured, and produces a static analysis report 123. The static analysis report 123 produced by the static analyzer includes detected errors 124 (not necessarily all which are true errors), code snippets vectors 125 and meta data associated with every code snippet 126, which contains that error (e.g., author, branch, etc.). Table 1 below demonstrates an example of meta-data in a static analysis report associated with a violation.

TABLE 1

Example of metadata for a violation

| | |
|---|---|
| Analysis type | FA |
| Description | Injection of data received from servlet request ("this") to Java reflection method |
| Finding author | Modtest |
| Finding id | 77f0b01a-8370-3f0f-bc9d-c654f1ad1c94 |
| Finding region end line | 52 |
| Finding region end position | 98 |
| Finding region start line | 52 |
| Finding region start position | 8 |
| Finding resource hash | 1597438970 |
| Finding resource id | c1b76af8-5449-3ecf-88bf-eb3a2886997f |
| Finding resource module name | com.enonic.cms:cms-api |
| Finding resource module original id | com.enonic.cms:cms-api |
| Finding resource module path | / com.enonic.cms:cms-api |
| finding.resource.moduleRelativePath | src/main/java/com/enonic/cms/api/client/binrpc/BinRpcInvocation.java |
| finding.resource.path | src/main/java/com/enonic/cms/api/client/binrpc/BinRpcInvocation.java |
| finding.resource.searchPath | com.enonic.cms:cms-api/src/main/java/com/enonic/cms/api/client/binrpc/BinRpcInvocation.java |
| finding.resource.unbranchedResource.id | 665cf3b2-7c2e-3f61-bf85-a8224f3ded34 |
| finding.status | Failed |
| Id | a9f8bd2a-ff32-352f-87f6-eb4eb26ee77e |
| metadata.assignee | Unknown |
| metadata.classification | Undefined |
| metadata.priority | Not Defined |
| metadata.violationAction | None |
| rule.analyzer.id | com.parasoft.jtest.flowanalyzer |
| rule.category.description | Security |
| rule.category.id | BD.SECURITY |
| rule.id | BD.SECURITY.TDRFL |
| Severity | 1 |
| unbranchedViolation.id | 2e73c596-9d68-3b35-91a7-6950b6c4db1d |

The report 123 is then processed by a recommender system (engine) 127, for example, a machine learning (ML) engine, which encodes the meta data into vectors and combines the vectors for methods with their meta data. As a user selects a violation for a review, the user reviews the violation and determines fixes or suppresses it. The recommender system 127 updates the recommendations for all users based on this new information. The recommender system uses the information about the violations reviewed by all users to maintain a utility matrix for users and violations, in which every cell contains either the result of a review of this user of this violation, or a predicted action (fix, suppress) for this user for this violation. The users 1-N interacting with the recommender system repeat their actions/inputs, and the recommender system updates its recommendations after every such action.

Figure 1B:
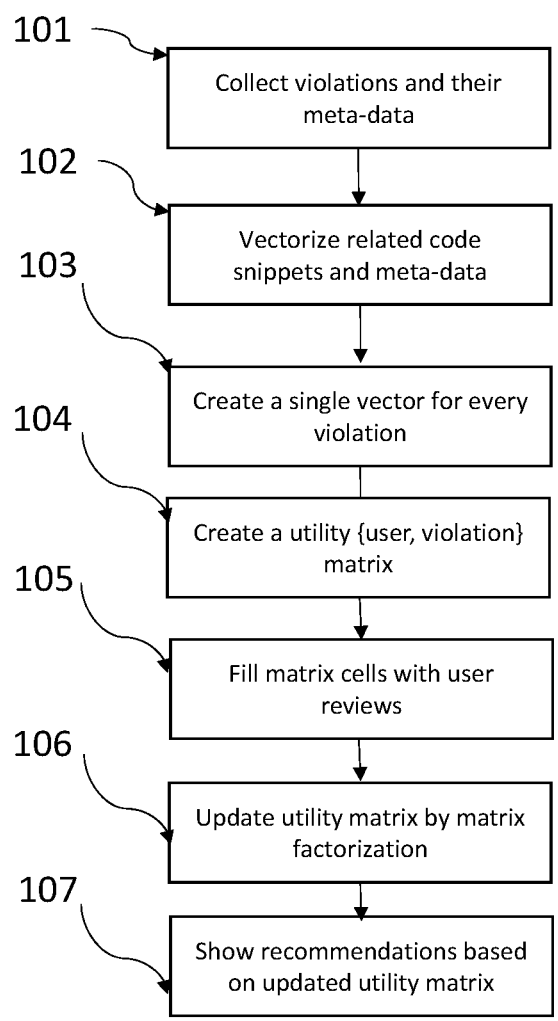
FIG. 1B illustrates an exemplary process for using static analysis features combined with code representation features, according to some embodiments of the disclosure.

FIG. 1B illustrates an exemplary process for using static analysis features combined with code representation features related to test violations to further analyze and improve the test violations, according to some embodiments of disclosed invention. As shown in block 101, violations from a static analysis tool and the meta data related to the violations are collected, for example, over a wireless computer network.

As shown in block 102, for every violation from a static analysis, two vectors are constructed. A function (method or code snippet), in which this violation is found (located), is encoded into a first vector and a meta-data associated with this violation is encoded into a second vector.

In some embodiments, the first vector may be created based on:

Bag of words embeddings (of source code) counting the number of occurrences of every word (and token) in the source code of the program and represents a vector of fixed length with counts of a certain token or word in a specific position in the vector, Embeddings obtained from training a neural network model on examples of source code and violations, or Any other source code embedding technique created from the snippet of code surrounding the violation.

As used here, embedding is mapping from objects to vectors of real numbers. For example, word embedding refers to all-natural language processing approaches where words (or sequence of words) are mapped onto vectors of real numbers.

Figure 2B:
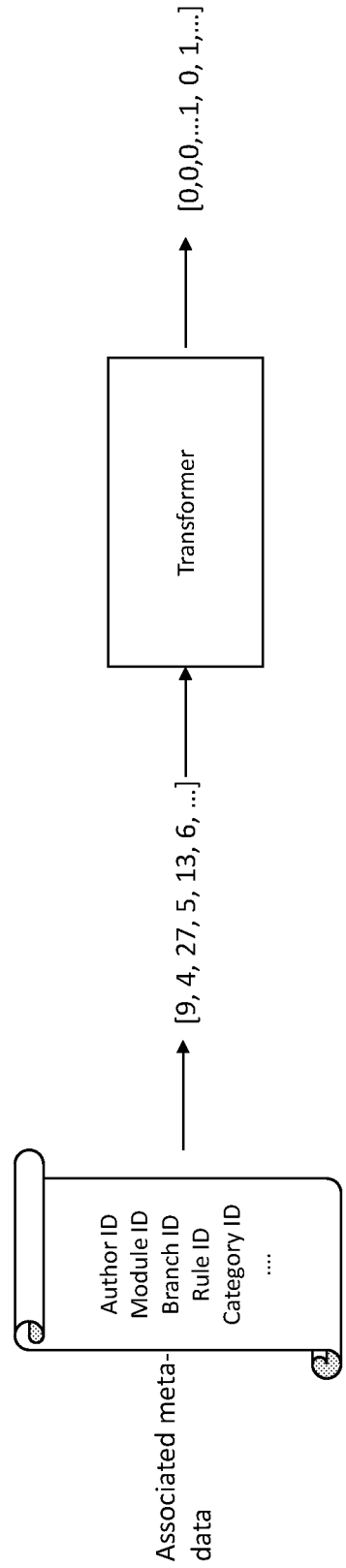
FIG. 2B shows an exemplary process for meta data vectorization, according to some embodiments of the disclosure.

An exemplary process of code snippet vectorization is presented in FIG. 2A, described in more detail below.

In some embodiments, the second vector may be created based on a factorization process encodes meta data objects as an enumerated type. An exemplary process of meta data vectorization is presented and describe with respect to FIG. 2B. The metadata is factorized by transforming every value in every column into a category and assigning every category an integer. For every violation i a vector $V_i$ is created as output of factorization process.

An exemplary list of violations and related meta data is shown in Table 2 below. The columns of Table 2 correspond to rows in Table 1 and presents a subset of all features of every violation. As shown in Table 2, every row contains the following information: the id of a violation (Viol 1), the static analysis rule associated with the violation (BD-PB-NP), the analysis type (FA), priority of this particular rule (1), the name of the build where this violation appeared (pscom_nightly), the flow analysis category (BD-PB), the author (e.g., John), and path to the source code (pscom/src/unix/debug/StackTrace.cc).

TABLE 2

| Violation Id | Metadata | | | | | Path to source code related to violation |
|---|---|---|---|---|---|---|
| Viol 1  | BD-PB-NP    | FA | 1 | pscom_nightly         | BD-PB  | John    | pscom/src/unix/debug/StackTrace.cc |
| Viol 2  | BD-PB-NP    | FA | 1 | eclipsedriver_nightly | BD-PB  | Mike    | cpp/cpptest/modules/eclipsedriver/driver.cc |
| Viol 3  | BD-PB-DEREF | FA | 2 | eclipsedriver_nightly | BD-PB  | Pablo   | cpp/cpptest/modules/eclipsedriver/driver.cc |
| Viol 4  | INIT-06     | CS | 1 | pscom_nightly         | INIT   | Mike    | pscom/src/unix/os/ProcessImpl.cc |
| Viol 5  | BD-PB-NP    | FA | 1 | eclipsedriver_nightly | BD-PB  | Mike    | cpp/cpptest/modules/eclipsedriver/driver.cc |
| Viol 6  | BD-RES-LEAKS| FA | 1 | eclipsedriver_nightly | BD-RES | Pablo   | cpp/cpptest/modules/eclipsedriver/driver.cc |
| Viol 7  | BD-PB-CC    | FA | 2 | eclipsedriver_nightly | BD-PB  | Pablo   | cpp/cpptest/modules/eclipsedriver/driver.cc |
| Viol 8  | BD-PB-NP    | FA | 1 | cpptestdebug_nightly  | BD-PB  | John    | cpp/cpptest/modules/cpptestdebug/src/Gcc.c |
| Viol 9  | BD-PB-NP    | FA | 1 | cpptesttrace_nightly  | BD-PB  | John    | cpp/cpptest/modules/cpptesttrace/src/unix/CppTestTrace.c |
| Viol 10 | BD-PB-NP    | FA | 1 | eclipsedriver_nightly | BD-PB  | Mike    | cpp/cpptest/modules/eclipsedriver/driver.cc |
| Viol 11 | BD-PB-CC    | FA | 2 | edgtk_nightly         | BD-PB  | Mike    | cpp/edgtk/src/Tokens.cc |
| Viol 12 | BD-PB-NP    | FA | 1 | eclipsedriver_nightly | BD-PB  | Mike    | cpp/cpptest/modules/eclipsedriver/driver.cc |
| Viol 13 | BD-PB-DEREF | FA | 2 | eclipsedriver_nightly | BD-PB  | John    | cpp/cpptest/modules/eclipsedriver/driver.cc |
| Viol 14 | BD-PB-NP    | FA | 1 | eclipsedriver_nightly | BD-PB  | Richard | cpp/cpptest/modules/eclipsedriver/driver.cc |
| Viol 15 | BD-PB-NP    | FA | 1 | eclipsedriver_nightly | BD-PB  | John    | cpp/cpptest/modules/eclipsedriver/driver.cc |
| Viol 16 | BD-PB-NP    | FA | 1 | eclipsedriver_nightly | BD-PB  | Richard | cpp/cpptest/modules/eclipsedriver/driver.cc |
| Viol 17 | BD-RES-LEAKS| FA | 1 | javalauncher_nightly  | BD-RES | Richard | cpp/cpptest/modules/javalauncher/src/Unix.cc |
| Viol 18 | BD-RES-LEAKS| FA | 1 | eclipsedriver_nightly | BD-RES | Richard | cpp/cpptest/modules/eclipsedriver/driver.cc |
| Viol 19 | BD-RES-LEAKS| FA | 1 | eclipsedriver_nightly | BD-RES | Richard | cpp/cpptest/modules/eclipsedriver/driver.cc |
| Viol 20 | BD-RES-LEAKS| FA | 1 | eclipsedriver_nightly | BD-RES | John    | cpp/cpptest/modules/eclipsedriver/driver.cc |

There are two vectors created in block 102: a) a function (method or code snippet), in which this violation is found (located), is encoded into a first vector, b) meta-data associated with a violation is encoded into a second vector. In block 103, two above vectors for a violation are then concatenated to create a single vector for the violation.

User reviews for violations are collected. In block 104, based on this data, a matrix is built. In some embodiments, the matrix is built in which every row corresponds to a user and every column corresponds to a violation (utility matrix). The values in each cell of the matrix correspond to a certain user's action on one of the violations. In block 105, the utility matrix is filled with user reviews, based on user's selection of the violations. If the user suppresses a violation, the value is 0, which represents that the user is not interested in the violation. If the user fixes or revises the violation, the value is 1, which means that the user is interested in the violation like this one. For the unreviewed violations, the values are missing in the matrix. In other words, the utility matrix is revised based on user selection of some violations.

FIG. 3A shows an exemplary utility matrix for test violations, according to some embodiments of the disclosure. As shown, the values for the utility matrix are "0" and "1," where "0" means that the violation has been reviewed by the user and suppressed, a "1" means that the violation has been reviewed by the user and fixed, and an empty cell means that the user has not reviewed this violation yet.

Referring back to FIG. 1B, in block 106, a matrix factorization process is performed (executed) to build the intermediate representations of users and sets of violations to update the utility matrix. In some embodiments, the intermediate representation includes two matrices: a first matrix represents intermediate representation of users, and a second matrix represent intermediate representation of sets of violations.

As known in the art, matrix factorization refers to a family of algorithms in which a matrix is represented as a product of two other matrices (i.e., the matrix is factorized). In some embodiments, the target matrices (output of the matrix factorization, where values of target matrices are output of factorizations, i.e., the two matrices described above.) are constructed in such a way that the error of the value of their product in the cells with the known actions is minimized. For example, multiplying the rows and columns of two matrices yields a matrix with values close to original utility matrix. In some embodiments the known gradient descent algorithm is used. As known, the gradient descent is a first-order iterative optimization algorithm for finding a local minimum of a differentiable function. The idea is to take repeated steps in the opposite direction of the gradient (or approximate gradient) of the function at the current point, because this is the direction of steepest descent. Conversely, stepping in the direction of the gradient will lead to a local maximum of that function; the procedure is then known as gradient descent.

Matrix factorization is based on utility matrix. FIG. 3A. By multiplying the rows and columns of these matrices, the predictions for the missing values in the original matrix are obtained since the values for empty cells of original matrix are the predicted values. As shown in block 107, the predictions for the missing values are recommendations for users. The predicted missing values are recommendations for users, as sown in FIG. 3B. The recommendation may then be displayed on a display screen.

An exemplary matrix (table) with recommended values is presented in FIG. 3B, where prediction for the missing value is equal 0 means that the violation has been recommended as suppressed, and prediction for the missing value is equal 1 means that the violation has been recommended as fixed.

FIG. 2A depicts construction of an exemplary vector for a function (method) using a BOW algorithm, according to some embodiments of the disclosed invention. In these embodiments, the vector for every violation is constructed by concatenation of the vector of the source code snipped containing the violation (created using BOW model) with the vector created from meta data information about the violation. As known in the art, the bag-of-words (BOW) model is a simplifying representation used in natural language processing and information retrieval. In this model, a text (such as a sentence or a document) is represented as the bag (multiset) of its words, disregarding grammar and even word order but keeping multiplicity. In practice, the BOW model can be used as a tool of feature generation.

For example, after transforming a text into a bag of words (BOW), one can calculate various measures or features to characterize the text. One type of characteristics, calculated from the BOW model is term frequency, namely, the number of times a term appears in the text. The comments in the source code are discarded, and all identifiers (names) such as functions, variables, constants, class names, etc. are encoded as the same token; all strings are encoded as the same token as well.

TABLE 3

| | |
|---|---|
| ; | 0 |
| *= | 1 |
| /= | 2 |
| %= | 3 |
| += | 4 |
| -= | 5 |
| / | 6 |
| * | 7 |
| ++ | 8 |
| -- | 9 |
| ( | 10 |
| ) | 11 |
| [ | 12 |
| ] | 13 |
| -> | 14 |
| ~ | 15 |
| ! | 16 |
| && | 17 |
| { | 18 |
| % | 19 |
| << | 20 |
| >> | 21 |
| <= | 22 |
| >= | 23 |
| < | 24 |
| > | 25 |
| == | 26 |
| != | 27 |
| ^ | 28 |
| \|\| | 29 |
| \| | 30 |
| ? | 31 |
| : | 32 |
| = | 33 |
| , | 34 |
| } | 35 |
| + | 36 |
| */ | 37 |
| = | 38 |
| , | 39 |
| # | 40 |
| + | 41 |
| */ | 42 |
| extends | 43 |
| final | 44 |
| finally | 45 |
| float | 46 |
| for | 47 |
| if | 48 |
| abstract | 49 |
| break | 50 |
| byte | 51 |
| case | 52 |
| catch | 53 |
| char | 54 |
| class | 55 |
| const | 56 |
| extends | 57 |
| do | 58 |
| implements | 59 |
| import | 60 |
| instanceof | 61 |
| try | 62 |
| void | 63 |
| while | 64 |
| new | 65 |
| package | 66 |
| private | 67 |
| continue | 68 |
| default | 69 |

Table 3 above illustrates an example of an encoding that is derived from the language grammar and that can be used to transform the source code into a BOW (first) vector. For example, all instances of the keyword 'char' are encoded into value 54. In the resulting BOW vector, the number of times the keyword 'char' is encountered will be written down in the position 54 of the resulting vector.

In some embodiments, the code snippets with violations are encoded into vectors using the BOW model. In the bag of words, every word from the dictionary, which is obtained from the grammar of the language by assigning every accepted sequence of tokens and keywords a position in the vector to which the number of occurrences of this token (keyword) is written. In some embodiments, these words are not weighted and the strings are replaced by a special token. The BOW is constructed using a table described above or a similar one.

In some embodiments, the disclosed invention is a non-transitory computer storage medium for improving the test results of a static code analyzer. The storage medium, such as Random-Access Memory (RAM) or hard drive, includes a plurality of programing instructions that when executed by a computer perform the process of the disclosed invention.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims and drawings.

The invention claimed is:

1. A method for recommending static analysis fixes in a computer program, the method comprising:
   receiving, over a computer network, a plurality of violations from a static analysis tool and meta-data related to the plurality of violations;
   for each of the plurality of violations, encoding a code snippet in which said each violation is located into a first vector and encoding the meta-data associated with said each violation into a second vector;
   for each of the plurality of violations, concatenating the first vector and the second vector into a single concatenated vector for said each violation;
   generating a utility matrix from the single vectors of each violation, wherein every row of the utility matrix corresponds to a user and every column corresponds to a violation, and wherein values in each cell of the utility matrix correspond to a certain user's action on one of the violations;
   revising the utility matrix, based on user selection of selected violations of the plurality of violations; and
   executing a matrix factorization process to build intermediate representations of users and violations to update the utility matrix as an updated utility matrix to obtain predictions for missing values, as recommendation to the user.

2. The method of claim 1, wherein the concatenated vector is generated by a bag of words (BOW) counting a number of occurrences of every word and token in a source code of the computer program; and representing the first vector and the second vector as a fixed length with counts of a certain token or word in a specific position in the first vector and the second vector.

3. The method of claim 1, wherein the concatenated vector is generated by embeddings obtained from training a neural network model on a source code of the computer program and the plurality of violations.

4. The method of claim 1, wherein the concatenated vector is generated by a source code embedding technique created from snippet of source code of the computer program surrounding each of the plurality of violations.

5. The method of claim 1, further comprising factorizing the meta-data by transforming every value into a category and assigning to every category an integer number.

6. The method of claim 1, wherein every row of the utility matrix includes a static analysis rule associated with the violation, an analysis type, a priority of the static analysis rule, a name of the build where the violation appeared, a flow analysis category, and a path to a source code of the computer program.

7. The method of claim 1, wherein each of the first vector and the second vector for each violation are constructed from a source code snipped containing the violation created using baq of words (BOW) model with the vector created from meta-data information about the violation.

8. The method of claim 1, wherein when a value for updated utility matrix is equal to 0, the violation is recommended to be suppressed, and when the value for updated utility matrix is equal to 1, the violation is recommended to be fixed.

9. The method of claim 1, wherein the plurality of violations from the static analysis tool includes detected errors and code snippets vectors.

10. The method of claim 1, wherein encoding and concatenating the first vector and the second vector is performed by a machine learning (ML) engine.

11. A system for recommending static analysis fixes in a computer program comprising:
a machine learning (ML) engine for receiving, over a computer network, a plurality of violations from a static analysis tool and meta-data related to the plurality of violations;
for each of the plurality of violations, encoding a code snippet in which said each violation is located into a first vector and encoding the meta-data associated with said each violation into a second vector;
for each of the plurality of violations, concatenating the first vector and the second vector into a single concatenated vector for said each violation;
generating a utility matrix from the single vectors of each violation, wherein every row of the utility matrix corresponds to a user and every column corresponds to a violation, and wherein values in each cell of the utility matrix correspond to a certain user's action on one of the violations;
revising the utility matrix, based on user selection of selected violations of the plurality of violations; and
executing a matrix factorization process to build intermediate representations of users and sets of violations to update the utility matrix as an updated utility matrix to obtain predictions for missing values, as recommendation to the user; and
a display for displaying the recommendation to the user.

12. The system of claim 11, wherein the concatenated vector is generated by a bag of words (BOW) counting a number of occurrences of every word and token in a source code of the computer program; and representing the first vector and the second vector as a fixed length with counts of a certain token or word in a specific position in the first vector and the second vector.

13. The system of claim 11, wherein the concatenated vector is generated by embeddings obtained from training a neural network model on a source code of the computer program and the plurality of violations.

14. The system of claim 11, wherein the concatenated vector is generated by a source code embedding technique created from snippet of source code of the computer program surrounding each of the plurality of violations.

15. The system of claim 11, wherein the machine learning (ML) engine further factorizes the meta-data by transforming every value into a category and assigning to every category an integer number.

16. The system of claim 11, wherein every row of the utility matrix includes, astatic analysis rule associated with the violation, an analysis type, a priority of the static analysis rule, a name of the build where the violation appeared, a flow analysis category, and a path to the a source code of the computer program.

17. The system of claim 11, wherein each of the first vector and the second vector for each violation are constructed from a source code snipped containing the violation created using bag of words (BOW) BOW model with the vector created from meta-data information about the violation.

18. The system of claim 11, wherein when a value for updated utility matrix is equal to 0, the violation is recommended to be suppressed, and when the value for updated utility matrix is equal to 1, the violation is recommended to be fixed.

19. The system of claim 11, wherein the plurality of violations from the static analysis tool includes detected errors and code snippets vectors.

* * * * *

UNITED STATES PATENT AND TRADEMARK OFFICE
CERTIFICATE OF CORRECTION

PATENT NO. : 11,836,068 B2
APPLICATION NO. : 17/574466
DATED : December 5, 2023
INVENTOR(S) : Leszek Jerzy Raszka et al.

It is certified that error appears in the above-identified patent and that said Letters Patent is hereby corrected as shown below:

In the Claims

In Column 11, Line 15, in Claim 7, delete "baq" and insert -- bag --.

In Column 12, Line 28, in Claim 16, delete "includes, astatic" and insert -- includes a static --.

In Column 12, Line 31, in Claim 16, after "to" delete "the".

In Column 12, Line 36, in Claim 17, after "(BOW)" delete "BOW".

Signed and Sealed this
Twenty-seventh Day of August, 2024

Katherine Kelly Vidal
*Director of the United States Patent and Trademark Office*